Aug. 7, 1951            J. F. DREYER            2,562,895
POLARIZING MEANS FOR REDUCING HEADLIGHT
GLARE AND OTHER PURPOSES

Filed July 1, 1949            2 Sheets-Sheet 1

INVENTOR
JOHN F. DREYER.
BY
Curtis, Morris & Safford.
ATTORNEY

Aug. 7, 1951

J. F. DREYER 2,562,895

POLARIZING MEANS FOR REDUCING HEADLIGHT
GLARE AND OTHER PURPOSES

Filed July 1, 1949

INVENTOR
JOHN F. DREYER.

BY
Curtis, Morris & Safford
ATTORNEYS

Patented Aug. 7, 1951

2,562,895

UNITED STATES PATENT OFFICE 2,562,895

POLARIZING MEANS FOR REDUCING HEAD-
LIGHT GLARE AND OTHER PURPOSES

John F. Dreyer, Cincinnati, Ohio

Application July 1, 1949, Serial No. 102,662

4 Claims. (Cl. 88—65)

This application is a continuation-in-part of my copending application Serial No. 746,205, filed May 6, 1947, now abandoned.

This invention relates to light-polarizing devices.

In the control of glare for many purposes, polarizing viewing-screens sometimes referred to as "analyzers," have been used as in windows, windshields, rear-view mirrors, glare visors, etc. of automobiles, airplanes, railway cars and boats. These viewing screens block the passage of polarized light when they are correctly positioned, but such blocking is quite critical with respect to angular rotation of the viewing-screen about an axis normal to its face.

Thus, for example, it has been proposed to control headlight glare on highways by polarizing the light of the headlamps, and then using polarizers on windshields or eye-glasses as a viewing-screen to block the glare from the polarizing lamps. Used on a straight level road, they have proved quite satisfactory, but the light-control may still be relatively ineffective when one car has a substantial slant relative to another, as when cars approach on opposite sides of a crowned road, or where one car is rounding a banked curve. In addition, reflected glare, as from an uneven wet highway or from the waves of a body of water may bring bright light to vehicle operators at angles tilted from a norm that only a small part of the glare is eliminated by standard polarizing means. Similar problems arise from the roll of boats and the banking of airplanes on turns.

In practice these possibilities of headlamp glare passing uncontrolled have been considered serious enough to prevent the general adoption of standard polarizing viewing-screens.

It is an object of my invention to make a polarizing device such as a viewing screen or "analyzer" which will be less critical to a particular rotational position. Other objects of the invention will be in part obvious and will in part appear hereinafter. These objects I achieve by superposing a plurality of polarizers each oriented respectively in a direction at a small angle to that of another.

For a fuller understanding of the nature and objects of the invention, reference should be had to the following detailed description taken in connection with the accompanying drawings, in which.

Pursuant to the invention, two polarizing layers are permanently assembled with the lines of polarization at a small angle. Angles from approximately 5° to approximately 12° give significant protection from glare when used in automobiles and other vehicles under usual conditions; for airplanes and boats, however, the angle of roll or bank may be greater so that angles up to about 15° may be used to give substantial protection, although these larger angles reduce the maximum glare reduction. Angles in the neighborhood of 10° give the best protection for most vehicle operation.

Figure 3:
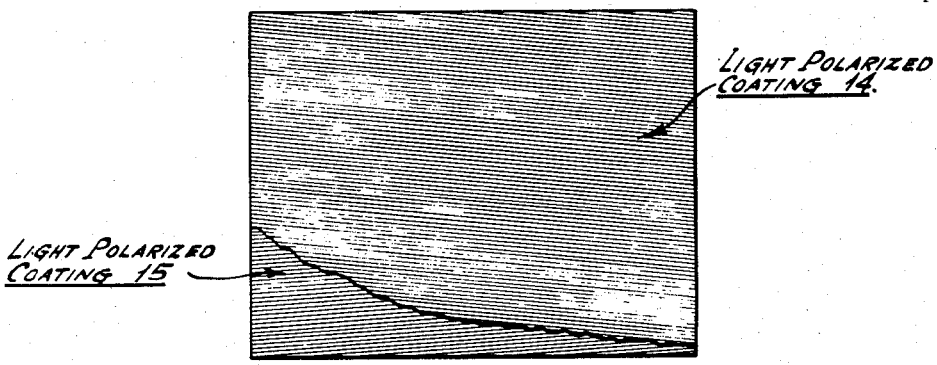
Figure 3 is a diagrammatic plan view of the viewing-screen showing two polarizing layers one of which is indicated as partly broken away to show the other.

In the drawings, lines of polarization are represented by the pale lines; and, as shown in Figure 3, those in the two layers respectively are at an angle of about 10°.

The layers of polarizing material can be on one side or on opposite sides of a support, or between supporting layers, or the support itself may be of a polarizing material which constitutes one of the polarizing layers. Others or all of the polarizing layers may be self-supporting plates.

Thus, for example, a special glare-reducing filter can be made by applying polarizing films, each to one side of sheet of glass, etc., each of which films respectively is oriented in a direction at an angle to the direction of orientation of the other in the final assembly; and then cementing the glass together with these polarizing films inside and adhering to the cement as set forth in my copending application Serial No. 785,859 filed November 14, 1947, which issued as Patent No. 2,553,961 on May 22, 1951. The polarizing film for this purpose may advantageously be of the type described and claimed in my Patent No. 2,400,877, issued May 28, 1946. Such films may also be formed on a separate support, and stripped and transferred to the transparent support like a decalcomania, e. g. as described and claimed in my prior copending application Serial No. 669,699, filed May 14, 1946, which issued as Patent No. 2,524,286 on October 3, 1950. These films can also be applied to opposite sides of the same support or one over the other on the same side of the support. Although I have referred specifically to two layers having a small angle between their respective axes of orientation, it will be understood that more layers may be used to give a combined effect each with a smaller angle to another and all lying within the small angle, e. g. 10° or 15° as stated. The resulting combined screen will be less critical to angle with respect to glare elimination, etc. When the polarizer consists of a molecularly oriented film, such as is disclosed in my Patent No. 2,400,877, one avoids the loss of light control with departure from parallelism between the surfaces of the polarizer and the analyzer, e. g., when cars approach on a curve or at the crest of a hill, which is characteristic of the older polarizers consisting of stretched or "smeared" plastic carrying the polarizer.

The density of the screen will, of course, be the sum of the densities of the several layers, each taken at a given angle of view. Such density is controlled by using thicker or thinner applied layer of liquid dye solution and of greater or less concentration.

The direction of rubbing for orienting of the dye will depend on the angle of polarization of the glare to be absorbed and on whether the dye is a "positive" or "negative" polarizer, i. e., whether it polarizes light in the same plane or perpendicularly to the plane of its polarization.

Figure 1:
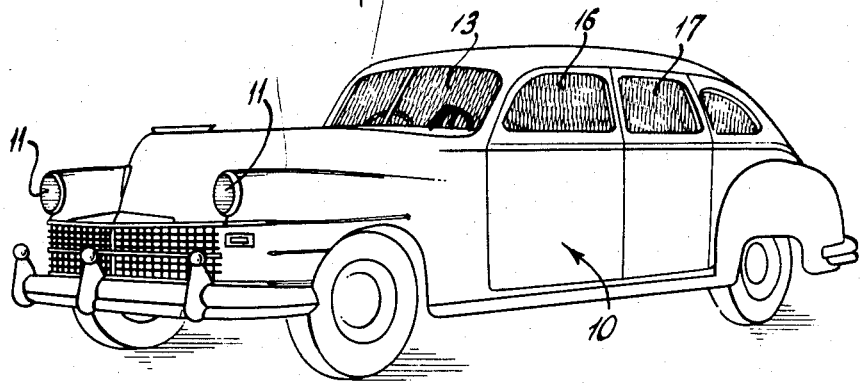
Figure 1 is a perspective view of an automobile embodying viewing-screens such as contemplated by the invention.
Figure 2:
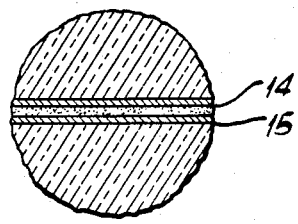
Figure 2 is a magnified field, sectional view through the windshield viewing screen of the automobile along the lines 2—2 of Figure 1.

As exemplified in Figure 1, an automobile 10 is equipped with headlights 11 having polarizing lenses 12 the lines of polarization of which run in a standard direction in this case shown as horizontal, so as to polarize light substantially parallel to the plane of polarization by reflection from wet pavements, tops of automobiles or windshields. This is indicated by the pale lines thereon, it being assumed that the lenses of headlights of other cars on the road will be arranged to polarize the light therefrom in a similar direction. The windshield 13 of the automobile 10 will include two polarizing layers 14 and 15 (Figs. 2 and 3) each adapted to polarize light in a direction generally perpendicular to the direction of polarization of the headlight lenses, so that it absorbs both light polarized by headlight lenses and glare from wet pavements, windshields, rear windows and car tops, etc. The individual layers 14 and 15 will have lines of polarization at a slight angle (10° in the present instance) to each other. As exemplified, the lines of polarization of each of the two layers 14 and 15 will be at an angle of 85° to the lines of polarization on the headlight lenses 12 and at 10° to each other. The side windows 16 and 17 may be polarized to absorb sky glare, again with a plus and minus angle to take care of tilting of the vehicle on going up and down hill.

Figure 4:
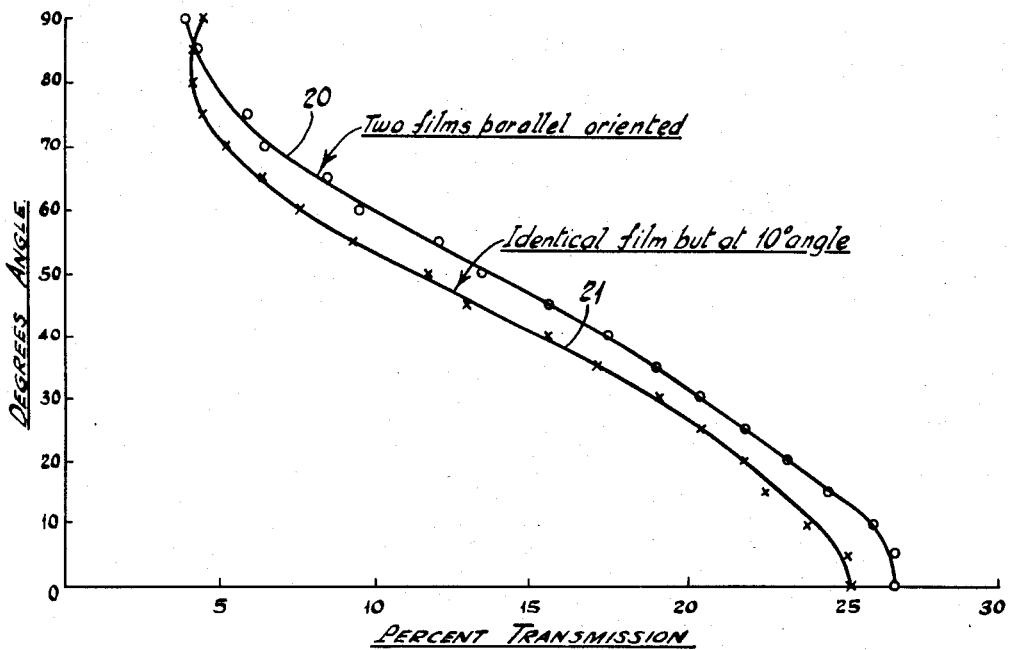
Figure 4 illustrates graphically the advantage of a viewing-screen constructed in accordance with the invention.

The chart of Figure 4 shows, comparatively, the effectiveness of the present invention in providing a solution of the problem of eliminating glare, as on a crowned road, on banked curves, and at other places where ordinarily polarizing means are relatively ineffective.

The angle in degrees is plotted against percent transmission to produce a curve 20 showing results when the two films of a duplex viewing-screen have parallel lines of orientation and a curve 21 with one film of a duplex viewing-screen has its lines of polarization at 10° to the lines of polarization of the other film of the duplex screen. In other words, the curve 20 was produced by a series of tests on a viewing-screen wherein the two layers of polarizing coating were superposed with their axes of maximum extinction parallel, and the curve 21 was produced by the use of a viewing-screen similar in all respects except that the same two superposed layers were oriented with their axes of maximum extinction at an angle of 10°. The percent transmission through each of these double-layer polarizers used as analyzers to view light previously passed through a standard polarizer was plotted against angles from 0° to 90°. For the analyzer having films at the 10° angle, the mean angle was taken as the position of the axis of the analyzer.

The points on the curve 20 are recorded by "o's" for the transmission through the two parallel films and on the curve 21 by "x's" for transmission through the two films angulated at 10°.

An incandescent 150-watt projector flood light was used for the light source. The angle was measured by mounting the analyzer on a calibrated adjustable level. The light intensity was measured by a General Electric Photocell, Model No. 8D W 40 Y I, covered with an eye-sensitivity correction filter.

As will be seen, the curves 20 and 21 are substantially parallel up to about a 75° angle of the analyzer whereupon the curve 21 of the readings for the angulated polarizer flattens out vertically giving greater extinction at angles spaced on each side of 90° and a lesser extinction at 90° than with the parallel superposed coatings. As will also be seen the 10° angulated polarizer is excellently adapted to eliminate glare throughout the range of angulated positions of the analyzer which in practice would be encountered between the polarizer on the headlight lens of an automobile and the analyzer on a windshield or eyeglasses in another automobile coming over a crowned road or around a banked curve.

The invention is likewise well adapted for use in eliminating glare problems which arise in other vehicles and like situations. For example, there is exemplified in Figure 5 a motor boat 25 having a windshield and glare visor 13ª which is formed similarly to the windshield 13 of Figures 1–3.

Figure 5:
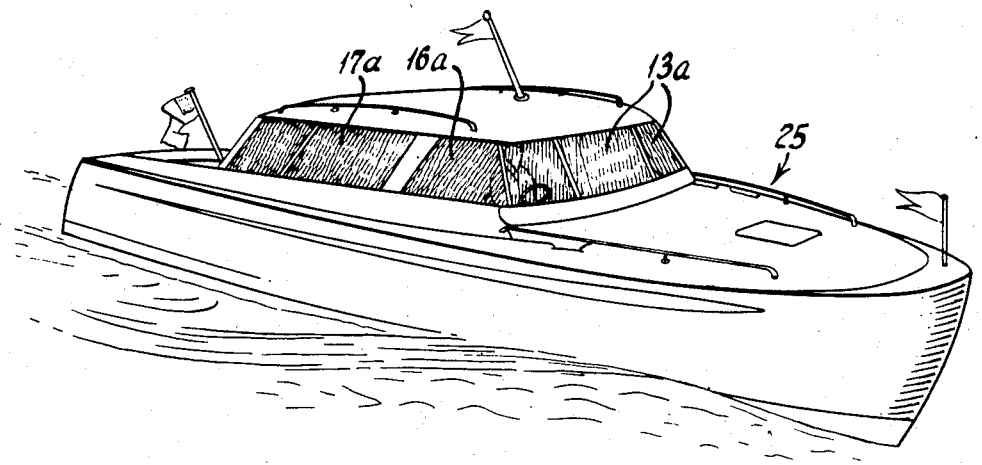
Figure 5 is a perspective view of a boat equipped with a viewing-screen such as contemplated by the invention.

In Figure 5 as in Figure 1, both the windshield 13ª and the windows or port lights 16ª, 17ª are made with the angulated analyzers of the present invention so as to avoid loss of effective glare control with changing angles of the waves and with roll and pitch of the boat.

Although I have found advantage in using multiple layers of polarizing film as described above, it is also possible to use a single layer of dyes which polarize on two or more axes within a small angle.

I claim:

1. A viewing-screen mounted on a vehicle for reduction of polarized glare light directed toward the screen which comprises as an integral unit two layers of light polarizing sheet material integrally-joined one overlying the other and having their respective planes of polarization permanently fixed at a definite angle in the range of about 5° to about 15° with respect to each other, wherein the planes of polarization are set substantially to block polarized glare light impinging upon the screen.

2. A viewing-screen mounted on a vehicle for reduction of polarized glare light directed toward the screen which comprises as an integral unit two layers of light polarizing sheet material integrally-joined one overlying the other and having their respective planes of polarization permanently fixed at a definite angle in the range of about 5° to about 12° with respect to each other, wherein the planes of polarization are set substantially to block polarized glare light impinging upon the screen.

3. A vehicle having permanently mounted thereon as an integral unit, a viewing screen for the reduction of polarized glare light directed toward the screen which comprises two layers of light polarizing sheet material integrally-joined one overlying the other and having their respective planes of polarization permanently fixed at a definite angle in the range of about 1° to 15° with respect to each other, wherein the mean plane of polarization is set substantially to block polarized glare light impinging upon the screen.

4. A viewing screen mounted on a vehicle for reduction of polarized glare light directed toward the screen as set forth in claim 1 wherein said definite angle is one in the neighborhood of 10°.

JOHN F. DREYER.

REFERENCES CITED

The following references are of record in the file of this patent:

UNITED STATES PATENTS

| Number | Name | Date |
| --- | --- | --- |
| 2,005,426 | Land | June 18, 1935 |
| 2,220,111 | Marks | Nov. 5, 1940 |
| 2,237,565 | Land | Apr. 8, 1941 |
| 2,359,456 | Young | Oct. 3, 1944 |

OTHER REFERENCES

Marks: 2 pgs. Trade Publication, published by Polarized Products Co., New York, stamp dated March 13, 1936.